United States Patent [19]

Nakamoto et al.

[11] Patent Number: 4,650,819

[45] Date of Patent: Mar. 17, 1987

[54] COATING COMPOSITION

[75] Inventors: Hideo Nakamoto, Nagoya; Tsutomu Okaya, Kasugai, both of Japan

[73] Assignee: Mitsubishi Rayon Co., Ltd., Tokyo, Japan

[21] Appl. No.: 766,333

[22] Filed: Aug. 16, 1985

[30] Foreign Application Priority Data

Aug. 21, 1984 [JP] Japan .................. 59-172507

[51] Int. Cl.$^4$ .............................................. C08K 3/22
[52] U.S. Cl. .................................. 523/223; 523/440; 523/457; 524/430
[58] Field of Search ............... 523/440, 457, 223; 524/430

[56] References Cited

U.S. PATENT DOCUMENTS 3,954,694  5/1976  Hallstrom et al. .................. 523/457

FOREIGN PATENT DOCUMENTS 55-9634    1/1980  Japan .................. 523/440
55-149343 11/1980  Japan .................. 523/440
58-213018 12/1983  Japan .................. 523/457

OTHER PUBLICATIONS

Lee et al.: Handbook of Epoxy Resins; McGraw-Hill Book Co.; 1967; pp. 15-11 and 24-24.

*Primary Examiner*—Lewis T. Jacobs
*Attorney, Agent, or Firm*—Oblon, Fisher, Spivak, McClelland & Maier

[57] ABSTRACT

A coating composition, which is excellent in abrasion resistance, comprises spherical α-alumina particles, a binder and a solvent, in which said spherical α-alumina particles are contained in an amount of from 35 to 85% by weight of the solid content in the coating composition.

9 Claims, No Drawings

COATING COMPOSITION

BACKGROUND OF THE INVENTION

1. Field of the Invention

This invention concerns a coating composition with excellent abrasion resistance suitable to the surface coating of a substrate such as of metals, fiber-reinforced plastics (hereinafter simply referred to as FRP) and other plastics.

2. Description of the Prior Art

As metals, FRP and other plastic materials have been used more and more in electric and electronic applications in recent years, an improvement is demanded for the surface durability of these substrate materials such as abrasion resistance and scratch resistance.

Various methods of surface treatment through abrasion-resistant coating have been proposed for improving the durability of metal materials and wooden floor materials, for instance, as described below:

(1) a composition comprising from 0.5 to 30% by weight of mineral substances mainly composed of aluminum oxide and from 1 to 50% by weight of fiberous substances incorporated through dispersion to an acid curing type amino alkyd resin or moisture-curing type polyurethane resin solid (Japanese Patent Publication No. 35487/1976), (2) a composition comprising from 5 to 7.5 parts by weight of α-alumina and from 2.5 to 5.0 parts by weight of silicon carbide blended with 100 parts by weight of a urethane resin (Japanese Patent Publication No. 33475/1980), (3) a coating composition comprising highly hard ceramics incorporated and dispersed into an abrasion-resistant thermoplastic resin (Japanese Patent Laid-Open No. 4930/1979), etc.

However, any of the compositions (1) and (2) is used for improving the durability of floor materials and it is difficult to provide a high surface durability demanded for metal, FRP, plastics in electric and electronic applications. In addition, the compositions have only an insufficient adhesion property for these materials. Further, the abrasin-resistant thermoplastic resin in the above composition (3), for example, nylon, polyacetal or teflon has an insufficient adhesion property for metal, FRP, plastics and can not provide a surface coating treatment of high abrasin resistance and scratch resistance.

SUMMARY OF THE INVENTION

An object of this invention is to provide a coating composition capable of forming a coating film having an excellent hardness, abrasion resistance and scratch resistance, as well as being excellent in various properties such as smoothness, adhesion property and chemical-resistance.

The foregoing object can be attained by a coating composition excellent in abrasion resistance comprising spherical α-alumina particles, a binder and a solvent, in which said spherical α-alumina particles are contained in an amount of from 35 to 85% by weight of the solid content in the coating composition.

DETAILED DESCRIPTION OF THE INVENTION

There are no particular restrictions for the starting material and the production process of the spherical α-alumina particles. For instance, those spherical α-alumina particles prepared directly by using γ-alumina as an intermediate product and those spherical particles prepared by pulverizing fine sintered products of α-alumina and re-sintering them can be used preferably. It is necessary in this invention to always use spherical α-alumina particles since the use of non-spherical α-alumina in the coating composition may significantly reduce the abrasion resistance of the resulted coating films.

A preferred amount of blending the spherical α-alumina particles is usually from 35 to 85% by weight and, preferably, from 50 to 80% by weight to the solid content of the coating composition. If the blending amount is less than 35% by weight, the abrasion resistance and the scratch resistance are extremely reduced. While on the other hand, if the blending amount exceeds 85% by weight, the coating processability is decreased and the adhesion property to each of the substrates is undesirably reduced.

Referring then to the particle size of the spherical α-alumina particles employed, the average particle size within a range between 5–50 μm and, preferably, 5–30 μm shows the most excellent abrasion resistance. If the particle size exceeds 50 μm, the particles are liable to be caught and detached from the resin layer by the effect of the acting frictional member in the course of the sliding movement. On the other hand, if the average particle size is less than 5 μm, they tend to behave together with the binder in which the properties of the binder resin becomes significant tending to eliminate the spherical effect.

The binder used as the second component in this invention can include epoxy resin, acrylic resin, urethane resin, fluorine resin, silicone resin and alkyd resin. Among all, the use of combination of epoxy resin or hydroxyl radical containing acrylic resin and curing agents capable of reaction therewith, or the use of thermoplastic acrylic resin is preferred.

The epoxy resin used in this invention may be a bisphenol type epoxy resin with 450 or more of epoxy equivalent, which may of course be commercially available ones. If the epoxy equivalent is less than 450, adhesion property to each of the substrates is particularly reduced. In addition, the abrasion resistance and scratch resistance or the like of the resultant coating film are significantly reduced.

The hydroxyl radical containing acrylic resin usable in this invention may be such an acrylic resin having a glass transition temperature of higher than 30° C. and a hydroxyl value of from 20 to 120. If the glass transition temperature of the acrylic resin is less than 30° C., the abrasion resistance, the scratch resistance and the like of the obtained coating film are significantly reduced, and the stain resistance and weatherability are also reduced. Further, if the hydroxyl value of the acrylic resin is less than 20, the solvent resistance, surface hardness and the abrasion resistance of the obtained coating film are reduced. While on the other hand, if the hydroxyl value of the acrylic resin exceeds 120, the processability for the coating, adhesion property and weatherability are reduced.

The acrylic resin as described above is prepared by polymerizing a monomer mixture comprising an essential component of hydroxyl radical containing (metha)acrylate, for example, 2-hydroxyethyl (metha)acrylate, 2-hydroxypropyl (metha)acrylate and (metha)acrylic acid alkyl ester and, optionally, other vinyl monomer copolymerizable with the above-mentioned hydroxyl radical containing acrylic monomer, for example, methacrylic acid, acrylic acid, styrene, vinyl toluene, vinyl acetate, vinyl propionate and acrylonitrile, in the usual manner.

There is no particular restriction for the curing agent used in combination with the epoxy resin and the hydroxy radical containing acrylic resin as described above and the curing agent can properly be selected from known curing agents. They can include, for example, amino resins represented by methyl etherfied melamine resin, butyl etherfied melamine resin, butyl etherfied benzoguanamine resin and butyl etherfied urea resin; polyisocyanate compounds or resins having at least two isocyanate groups in one molecule; compounds or resins having at least two acid anhydride groups in one molecule; silicone resin having at least two alkoxy silane groups in one molecule; and the like. Among all, amino resins and polyisocyanate compounds or resins provide a significant effect as the curing agent for the abrasion resistant coating for metal and FRP or plastics used in electrical and electronic applications. By properly determining the blending amount of the curing agent in view of the amount of the reactive groups for curing depending on the combination of the resin and the curing agent, the properties of the coating film can optionally be controlled. Usually, the curing agent is blended in such a ratio that the amount of the reactive groups in the curing agent is equivalent or less to the amount of the reactive groups in the epoxy resin and the hydroxyl radical containing acrylic resin.

Thermoplastic acrylic resins having a glass transition temperature of higher than 40° C. and a weight average molecular weight of greater than 30,000 can be used as the acrylic resin in this invention. The thermoplastic acrylic resin is produced by polymerizing a monomer mixture comprising a methacrylic acid alkyl ester and/or acrylic acid alkyl ester as the essential ingredient and one or more of other vinyl monomers copolymerizable with the (metha)acrylic acid alkyl ester, for example, styrene, vinyl toluene, vinyl acetate, (metha)acrylic acid, itaconic acid, 2-hydroxy ethyl (metha)acrylate, 2-hydroxyl propyl (metha)acrylate in a usual manner by using a radical polymerization initiation catalyst. If the glass transition temperature of the thermoplastic acrylic resin is lower than 40° C., not only the abrasion resistance and the scratch resistance of the thus obtained coating film are significantly reduced but also the stain resistance and weatherability are also impaired. While on the other hand, if the thermoplastic acrylic resin with the molecular weight of less than 30,000 is used, the physical strength of the obtained coating film is significantly reduced undesirably.

There is no particular restriction for the solvents used in this invention so long as the coated substrates are not degraded with the solvent. For instance, they include hydrocarbons such as toluene and xylene; esters such as ethyl acetate and butyl acetate; ketones such as methyl ethyl ketone and methyl isobutyl kentone and alcohols such as ethanol, isobutanol and n-butanol.

In using the coating composition according to this invention, the binder, spherical α-alumina, solvent and, if required, the curing agent as described above are blended each in a predetermined amount by a usual manner, which is coated by means of spray coating, roll coater coating or the like and then dried to obtain a strong coating film.

Upon blending the composition, additives, dyes, pigments or the likes usually employed may be added within such a range as not impairing the effect of this invention.

EXAMPLES 1-3

As shown in Table 1, disphenol A type epoxy resins of different epoxy equivalents were dissolved in a mixed solvent of toluene and cellosolve acetate to prepare epoxy resin solutions. Then, after mixing to dissolve Yuban ® 22R (registered trade mark; manufactured by Mitsui Toatsu Kagaku K.K.), which is a butyl etherfied melamine resin, into each of the epoxy resin solutions in a solid ratio of epoxy resin/melamine resin=60/40 (weight ratio), spherical α-alumina particles of 10 μm average particle size were added by 70% by weight converted as the solid component and stirred at a high speed to obtain coating materials (I), (II) and (III).

Each of the thus obtained coating materials was coated on a PBT resin molding product reinforced with 10% carbon fiber (manufactured by Mitsubishi Rayon K.K.) in a thickness of 40 μm and then baked at 130° C. for 40 min. Evaluations of the performance of the coating films on the coated articles obtained by this method are shown in Table 1. As the result, it can be seen that the coating materials according to this invention show extremely preferred abrasion resistance and scratched resistance.

TABLE 1

| Coating material | (I) | (II) | (III) | (IV) |
|---|---|---|---|---|
| Epoxy equivalent of epoxy resin | 470 | 920 | 2700 | 350 |
| α-alumina content (% by weight) | 50 | 70 | 80 | 70 |
| Pencil hardness | 8H | more than 9H | more than 9H | 3H |
| Abrasion resistance (mg) (note 1) | 70 | 65 | 60 | 130 |
| Adhesion property (note 2) | 100 | 100 | 95 | 60 |
| Scratch resistance (note 3) | no abnormality | no abnormality | no abnormality | slightly scratched |

(note 1): A taper type rotational abrasion tester and CS-17 as a frictional member were used and the abrasion resistance was determined as the amount after the tester was rotated for 2000 cycles under the speed of 1000 cycles per min and 1000 g of load.
(note 2): Cured film was scratched with a cutter knife at 2 mm interval to make 100 rectangular area and the tacky polyester tape was bonded and thereafter peeled from the surface. The adhesion property was indicated by the number of the rectangles remained on the coated plate.
(note 3): The scratch resistance was defined based on the state of the coated surface when rubbed 10 times with steel wools.

COMPARATIVE EXAMPLE 1

For the comparison, paint was formulated under the quite similar conditions as in Example 1 except for using an epoxy resin having a epoxy equivalent of 350 as shown in Table 1 to obtain a coating material (IV). A coated plate was prepared by using the coating material (IV) under the same conditions as those in Example 1 and the performance evaluation was carried out. The result is shown in Table 1.

EXAMPLES 4-6

Monomer compositions as shown in Table 2 were polymerized by using azobis isobutylonitrile as the polymerization initiator at 80° C. to obtain toluene solutions of acrylic resin with different glass transition temperatures and hydroxyl values. After adding Takenate D-110N (manufactured by Takeda Yakuhin Kogyo K.K.), which is the polyisocyanate compound, into each of the acrylic resin solutions such that the polyisocyanate were in equivalent with the hydroxy equivalent in the acrylic resins, spherical α-alumina particles of 10 μm average particle size were added by 50%, 70% and 80% by weight converted as the solid component and stirred at a high speed to obtain coating materials (V), (VI) and (VII) respectively.

Each of the coating materials thus obtained was spray-coated on a sand blasted steel plate to a thickness of 30 μm and dried at 60° C. for 60 min. The results of the performance evaluation for the coating films of the thus coated plate obtained in this manner are shown in Table 2. It can be seen from the result, that the abrasion resistant coating materials according to this invention show extremely excellent abrasion resistance and scratch resistance.

TABLE 2

|  | Example | | | Comparative Example | |
|---|---|---|---|---|---|
| Coating material | 4 (V) | 5 (VI) | 6 (VII) | 2 (VIII) | 3 (IX) |
| Monomer composition for polymerization (% by weight) | | | | | |
| Methyl methacrylate | 30 | 25 | 25 | — | 30 |
| Styrene | 30 | 30 | 25 | — | 30 |
| Butyl methacrylate | 30 | 30 | 30 | 80 | 36 |
| 2-hydroxyethyl methacrylate | 10 | 15 | 20 | 20 | 4 |
| Property of acrylic resin | | | | | |
| Glass transition temperature (°C.) | 70 | 66 | 64 | 27 | 66 |
| Hydroxyl-value | 43 | 64 | 86 | 86 | 17 |
| α-alumina content (% by weight) | 50 | 70 | 80 | 80 | 70 |
| Abrasion resistance (mg) (1) | 80 | 70 | 82 | 115 | 120 |
| Adhesion property (2) | 100 | 100 | 95 | 100 | 100 |
| Scratch resistance (3) | no abnormality | no abnormality | no abnormality | slightly scratched | slightly scratched |
| Pensil hardness | 8H | more than 9H | more than 9H | 3H | 3H |

Note (1)–(3): same as in Table 1.

COMPARATIVE EXAMPLES 2 AND 3

For the comparison, paints were prepared quite in the same conditions as in Example 4 except for using acrylic resins of different glass transition temperature and hydroxyl values as shown in Table 2 to prepare coating materials (VIII) and (IX). Coated plates were prepared under the same conditions as those in Example 4 using these coating materials and the performance evaluation was practiced or carried out. The results are shown in Table 2.

EXAMPLE 7

Spherical α-alumina particles of 10 μm average particle size were added in 65% by weight converted as solid component into an acrylic solution prepared by polymerizing 99 parts of methyl methacrylate, one part of acrylic acid and 150 parts of toluene (acrylic resin having a glass transition temperature of 105° C. and a weight average molecular weight of 70,000) and stirred at a high speed to obtain a coating material (X).

The thus obtained coating material (X) was diluted with a thinner (20% by weight of toluene, 40% by weight of butanol and 40% by weight of methyl ethyl ketone), which was spray coated on an ABS resin plate to a thickness of 30 μm and then dried at 50° C. for 50 min. The results for the performance evaluation of the coating film on the plate obtained in this way are shown in Table 3. From the results, it can be seen that the coating material according to this invention shows extremely preferred abrasion resistance and scratched resistance.

COMPARATIVE EXAMPLE 4

A coating material (XI) was obtained by the same procedures as in the example 7 using a 40% by weight of toluene solution of n-butylmethacrylate polymer having a weight average molecular weight of 75,000 and a glass transition temperature of 20° C., which was coated on an ABS resin plate. The result for the performance evaluation of the coated film on the resin plate are shown in Table 3.

COMPARATIVE EXAMPLE 5

A coating material (XII) was obtained in the same procedures as in Example 7 except for using an acrylic resin having a weight average molecular weight reduced to 25,000, which was coated on an ABS resin plate. The results for the performance evaluation for the coated film on the resin plate are shown in Table 3.

TABLE 3

|  | Example | Comparative Example | |
|---|---|---|---|
| Coating material | 7 (X) | 4 (XI) | 5 (XII) |
| Acrylic resin, glass transition temperature (°C.) | 105 | 20 | 105 |
| Acrylic resin, average molecular weight | 70,000 | 75,000 | 25,000 |
| Pencil hardness | 7H | H | 5H |
| Abrasion resistance (mg) (1) | 85 | 185 | 169 |
| Adhesion property (2) | 100 | 100 | 90 |
| Scratch resistance (3) | no abnormality | entirely injured | entirely injured |

Notes (1)–(3): same as in Table 1.

EXAMPLE 8 AND COMPARATIVE EXAMPLES 6 AND 7

Spherical α-alumina particles of 10 μm average particle size were added to the acrylic resin solution obtained in Example 7 by 50% by weight (Example 8), 33% by weight (Comparative Example 6) and 87% by weight (Comparative Example 7) respectively converted as the solid component and stirred at a high speed to obtain coating materials (XIII), (XIV) and (XV). Each of the coating materials (XIII)–(XV) thus obtained was coated on an ABS resin plate and dried in the same procedures as in Example 7. The results for the performance evaluation for the coated films on the plates are shown in Table 4. The results for the coating material of Example 7 are also shown in Table 4.

TABLE 4

|  | Example | | Comparative Example | |
|---|---|---|---|---|
| Coating material | 7 (I) | 8 (XIII) | 6 (XIV) | 7 (XV) |
| α-alumina content (%) | 65 | 50 | 33 | 87 |
| Pencil hardness (1) | 7H | 6H | 2H | 7H |
| Abrasion resistance (mg) (2) | 85 | 97 | 190 | 160 |

TABLE 4-continued

| | Example | | Comparative Example | |
|---|---|---|---|---|
| Coating material | 7 (I) | 8 (XIII) | 6 (XIV) | 7 (XV) |
| Adhesion property (3) | 100 | 100 | 100 | 75 |
| Scratch resistance | no abnormality | no abnormality | slightly injured | no abnormality |

Notes (1)–(3): same as in Table 1.

What is claimed is:

1. A coating composition excellent in abrasion resistance comprising spherical α-alumina particles, a binder selected from the group consisting of a bisphenol A epoxy resin having an epoxy equivalent of 450 or more and an acrylic resin having a glass transition temperature of 30° C. or higher and a hydroxyl value of from 20 to 120, a curing agent and a solvent, in which said spherical α-alumina particles are contained in an amount of from 35 to 85% by weight of the solid content in the coating composition.

2. The coating composition excellent in the abrasion resistance as defined in claim 1, wherein the binder comprises a bisphenol A epoxy resin having an epoxy equivalent of 450 or more and a curing agent.

3. The coating composition excellent in abrasion resistance as defined in claim 2, wherein the curing agent is a polyisocyanate compound.

4. The coating composition excellent in abrasion resistance as defined in claim 2, wherein the curing agent is an amino resin.

5. The coating composition excellent in abrasion resistance as defined in claim 1, wherein the binder comprises an acrylic resin having a glass transition temperature of 30° C. or higher and a hydroxyl value of from 20 to 120 and a curing agent.

6. The coating composition excellent in the abrasion resistance as defined in claim 5, wherein the curing agent is a polyisocyanate compound.

7. The coating composition excellent in the abrasion resistance as defined in claim 5, wherein the curing agent is an amino resin.

8. The coating composition excellent in the abrasion resistance as defined in claim 1, wherein the binder comprises a thermoplastic acrylic resin having a glass transition temperature of 40° C. or higher and a weight average molecular weight of 30,000 or greater.

9. The coating composition excellent in the abrasion resistance as defined in claim 1, wherein the average particle size of the spherical α-alumina particles lies within a range between 5 and 50 μm.

* * * * *